US008745478B2

(12) United States Patent
Braun et al.

(10) Patent No.: US 8,745,478 B2
(45) Date of Patent: Jun. 3, 2014

(54) SYSTEM AND METHOD FOR GENERATING INSPIRATION BOARDS

(75) Inventors: Karen Braun, Fairport, NY (US); Patricia Swenton-Wall, Victor, NY (US); Mary Ann Sprague, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 1048 days.

(21) Appl. No.: 12/168,447

(22) Filed: Jul. 7, 2008

(65) Prior Publication Data

US 2010/0005378 A1 Jan. 7, 2010

(51) Int. Cl.
*G06F 17/00* (2006.01)

(52) U.S. Cl.
USPC ............ 715/204; 715/202; 715/260; 715/262

(58) Field of Classification Search
CPC .............. G06F 17/211; G06F 17/2795; G06F 17/30017; G06F 17/30696
USPC .......................... 715/260, 252, 204, 211, 253
See application file for complete search history.

(56) References Cited

U.S. PATENT DOCUMENTS

| | | | |
|---|---|---|---|
| 5,424,945 A | 6/1995 | Bell | |
| 5,493,677 A * | 2/1996 | Balogh et al. | 382/305 |
| 6,021,412 A * | 2/2000 | Ho et al. | 1/1 |
| 6,853,980 B1 * | 2/2005 | Ying et al. | 705/26.62 |
| 7,010,746 B2 | 3/2006 | Purvis | |
| 7,107,525 B2 | 9/2006 | Purvis | |
| 7,197,707 B2 * | 3/2007 | Cicchitelli et al. | 715/269 |
| 7,225,401 B2 | 5/2007 | Purvis | |
| 7,243,303 B2 | 7/2007 | Purvis et al. | |
| 7,512,537 B2 * | 3/2009 | Pahud et al. | 704/272 |
| 7,539,939 B1 * | 5/2009 | Schomer | 715/269 |
| 7,822,763 B2 * | 10/2010 | Sauls et al. | 707/766 |
| 7,890,521 B1 * | 2/2011 | Grushetskyy et al. | 707/755 |
| 2003/0063113 A1 * | 4/2003 | Andrae | 345/700 |
| 2004/0019850 A1 | 1/2004 | Purvis et al. | |
| 2004/0019851 A1 | 1/2004 | Purvis et al. | |
| 2004/0205515 A1 * | 10/2004 | Socolow et al. | 715/501.1 |
| 2005/0154980 A1 | 7/2005 | Purvis et al. | |
| 2007/0005356 A1 | 1/2007 | Perronnin | |
| 2007/0133842 A1 | 6/2007 | Harrington | |
| 2007/0180363 A1 | 8/2007 | Dance | |
| 2007/0258648 A1 | 11/2007 | Perronnin | |
| 2008/0069456 A1 | 3/2008 | Perronnin | |
| 2010/0005378 A1 * | 1/2010 | Braun et al. | 715/202 |

OTHER PUBLICATIONS

Microsoft, PowerPoint 2007 ClipArt, Jan. 2007 (p. 1-5).*
Faithe Wempen, PowerPoint 2007 Bible, Feb. 2007, Wiley & Sons.*
PowerPoint 2007 ClipArt Screenshots, taken Aug. 2011.*

* cited by examiner

*Primary Examiner* — Adam M Queler
*Assistant Examiner* — Howard Cortes
(74) *Attorney, Agent, or Firm* — MH2 Technology Law Group LLP (57) ABSTRACT

A system and method are provided for automatically generating an inspiration board. The system and method involves inputting at least one term into a computer system. Based on the inputted term, at least one image is selected from a database of images stored in the computer system and at least one pattern from a database of patterns stored in the computer system. The inspiration board is assembled by the computer system using the image and the pattern.

18 Claims, 5 Drawing Sheets

SYSTEM AND METHOD FOR GENERATING INSPIRATION BOARDS

BACKGROUND

The present disclosure is related to the generation of inspiration boards or mood boards, and more specifically, it is directed to the automatic generation of inspiration or mood boards.

Inspiration boards are created by graphic designers when they are asked to create a campaign for a client. The inspiration board gives the client a feel for the campaign. These boards are comprised of magazine clippings, wallpaper samples, text in different fonts, ribbons, and other visual items that are pasted or pinned to a board. The board itself is covered in a fabric or paper that serves as a background for the board.

The items chosen to be placed on a board are based on a series of words that are agreed to between the designer and the client. These words include nouns and adjectives such as warm, family, happy, loving, red, etc. Based on these words, a board is created to convey the mood, color scheme, themes, etc. for a campaign to the client so that client can agree to the direction of the campaign before work begins on the actual design.

Creating a board takes time because a designer has to gather images, patterns, wallpaper samples, etc. in order to create the board. Once the items are gathered, the designer then has to apply the items to the board which takes additional time. As such, there is a need for a more efficient and less time-consuming method for creating an inspiration board.

SUMMARY

According to the present disclosure a system for generating an inspiration board is provided. The system includes an input device operable to receive at least one term and a database of images and a database of patterns stored thereon. The system also includes a processor operable to generate the inspiration board. The processor accesses the memory in order to select at least one image from the database of images and at least one pattern from the database of patterns to apply to the inspiration board based on the term received by the input device.

In yet another embodiment, a database of fonts is provided. The processor selects at least one font from the database of fonts and applies the selected font to at least one of the terms.

In an embodiment, the memory further comprises a thesaurus. The thesaurus provides synonyms for the term or terms received by the input device.

In yet another embodiment, the processor selects at least one image from the database of images, at least one font from the database of fonts and at least one pattern from the database of patterns to apply to the inspiration board based on the synonyms provided by the thesaurus.

In yet another embodiment, a method for automatically generating an inspiration board is provided. The method includes inputting at least one term into a computer system, selecting at least one image from a database of images stored in the computer system based on the term or terms and selecting at least one pattern from a database of patterns stored in the computer system based on the term or terms. The inspiration board is assembled by the computer system using the at least one image and the at least one pattern.

In yet another embodiment, the method includes selecting at least one font from a database of fonts based on the term or terms. The selected font is applied to the term or terms to make a graphical element to be applied to the board.

In yet another embodiment, at least one synonym is obtained for the term from a thesaurus stored in the computer system.

In yet another embodiment, the at least one image, the at least one font and the at least one pattern is selected based on the at least one synonym obtained from the thesaurus.

In yet another embodiment, the selected font is applied to the synonym to make a graphical element to be applied to the board.

In yet another embodiment, the term is a color name, noun, or adjective.

In yet another embodiment, selecting the image involves reading metadata associated with each image in the database of images, comparing the term, terms or synonyms to the metadata of each image, and selecting the image having metadata that matches the term, terms or synonyms.

In yet another embodiment, selecting the image selects a plurality of images and each of the plurality of images are compared to each other. If there are minimal differences between two images, the duplicate image is removed.

In yet another embodiment, selecting the font involves reading metadata associated with each font in the database of fonts, comparing the term, terms or synonyms to the metadata of each font, and selecting the font having metadata that matches the term, terms or synonyms.

In yet another embodiment, selecting the pattern involves reading metadata associated with each pattern in the database of pattern, comparing the term, terms or synonyms to the metadata of each pattern, and selecting the pattern having metadata that matches the term, terms or synonyms.

In yet another embodiment, image processing is applied to the image selected. The image processing applied include but is not limited to a drop shadow, rotation, scaling of the image, softening the image edges, sharpening the image edges, edge detection, adding borders, and other image enhancements.

In yet another embodiment, assembling the inspiration board also includes adding the at least one term to the inspiration board.

In yet another embodiment, assembling the inspiration board also includes adding the at least one synonym to the inspiration board.

In yet another embodiment, image processing is applied to the at least one term. The image processing applied include but is not limited to a drop shadow, rotation, scaling of the image, softening the image edges, sharpening the image edges, edge detection, adding borders, and other image enhancements.

In yet another embodiment, image processing is applied to the at least one synonym. The image processing applied include but is not limited to a drop shadow, rotation, scaling of the image, softening the image edges, sharpening the image edges, edge detection, adding borders, and other image enhancements.

In yet another embodiment, a computer-readable storage medium having a program stored thereon is provided. The program when executed by a computer causes the computer to receive at least one term, select at least one image from a database of images based on the term or terms and select at least one pattern from a database of patterns based on the term or terms. The computer also assembles the inspiration board using the at least one image and the at least one pattern.

In yet another embodiment, the computer obtains at least one synonym for the at least one term from a thesaurus.

In yet another embodiment, the computer selects at least one font from a database of fonts based on the term or terms. The selected font is applied to the term or terms to make a graphical element to be applied to the board.

In yet another embodiment, the computer selects the at least one image, the at least one font and the at least one pattern based on the at least one synonym obtained from the thesaurus.

DETAILED DESCRIPTION

Embodiments will be described below while referencing the accompanying figures. The accompanying figures are merely examples and are not intended to limit the scope of the invention.

Figure 1:
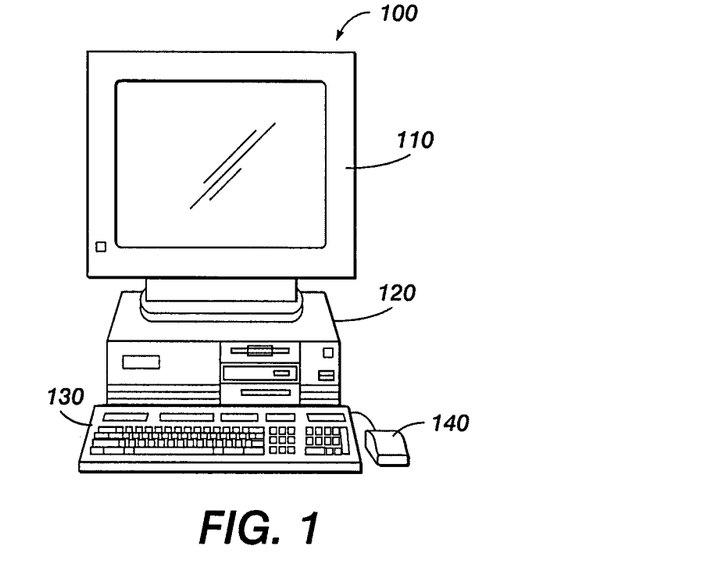
FIG. 1 illustrates a system in accordance with the present disclosure.

FIG. 1 illustrates a computer system 100 in accordance with the present disclosure. The computer system 100 includes a monitor 1 10, a computer 120, and a number of input devices. For instance, computer system 100 may have a keyboard 130 and a mouse 140 attached to computer 120. Although FIG. 1 depicts a keyboard 130 and a mouse 140, other peripherals may also be attached to computer 120 such as a scanner, drawing pad, printer, etc. In addition, although FIG. 1 depicts a desktop computer, any other computer may also be used such as a network terminal or a laptop computer.

Figure 2:
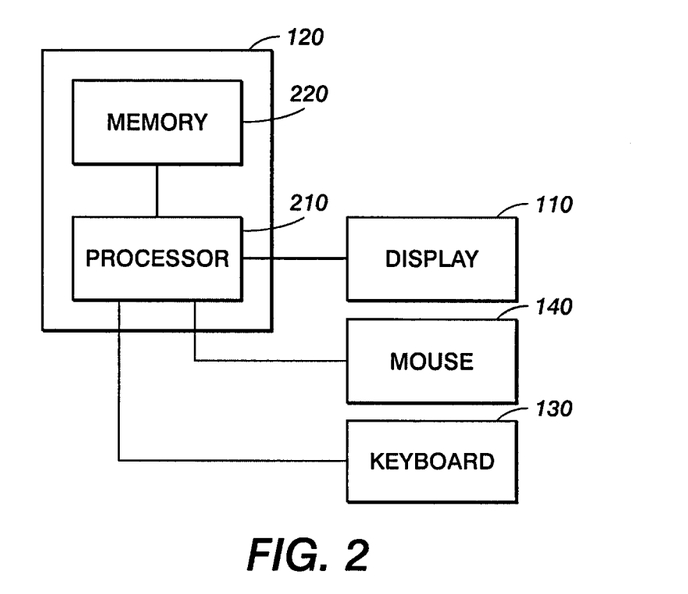
FIG. 2 illustrates a system in accordance with the present disclosure.

FIG. 2 illustrates a more detailed version of computer system 100. As shown in FIG. 2, computer 120 includes at least a processor 210 and a memory 220. Processor 210, as will be described in more detail below, generates the inspiration board using data stored in memory 220. Memory 220 may be a semiconductor memory such a read only memory (ROM), random access memory (RAM), a hard disk drive, an optical recording medium or any other medium capable of storing data. Although FIG. 2 shows the processor 210 and memory 220 embodied in a desktop computer, the present disclosure is not limited to such an embodiment. Processor 210 may be located in a desktop computer or a network terminal and memory 220 may be located at another location such as another desktop computer located on a network or a website that is capable of storing images, fonts and patterns such as www.flickr.com, www.google.com, and other sites capable of storing images, fonts or patterns.

Figure 3:
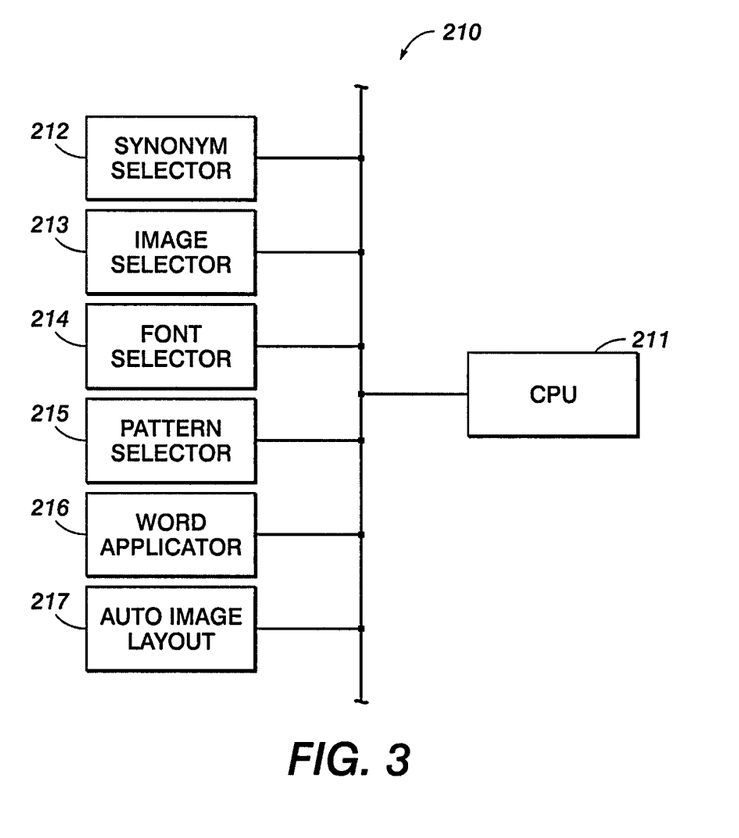
FIG. 3 illustrates a processing module in accordance with the present disclosure.

FIG. 3 illustrates an example of a processor 210. Processor 210 includes a central processing unit (CPU) 211. Although FIG. 3 depicts a single CPU, any number of CPUs may be used in the system. Processor 210 may also include a synonym selector 212, image selector 213, font selector 214, pattern selector 215, word applicator 216 and auto image layout 217. Elements 212 to 217 can be collectively referred to as an inspiration board generator and their functions will be described in more detail below.

Figure 4:
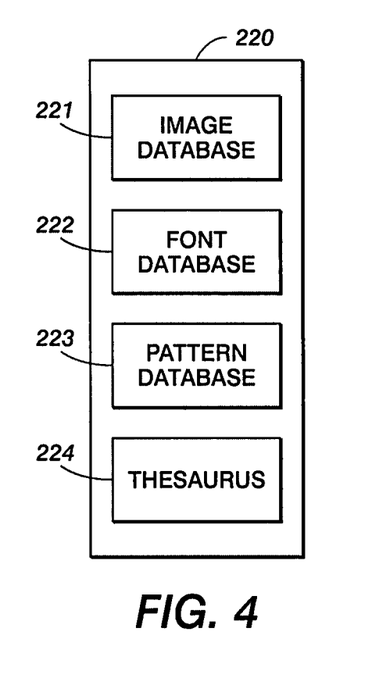
FIG. 4 illustrates a memory module in accordance with the present disclosure.

FIG. 4 depicts an example of a memory 220 in accordance with the present disclosure. As shown in FIG. 4, memory 220 includes an image database 221. Image database 221 may include a number of images that can be used to generate an inspiration board. Each image may have metadata appended to the image. The metadata may include descriptors or tags that describe the image so that when an inspiration board is created, images can be automatically selected. Alternatively, image database 221 may include a number of pointers that point to images stored on a designer's computer, a network server, or images freely accessible on the Internet. As with the images, each pointer may have metadata associated therewith. Alternatively, the metadata may be generated using any number of techniques for automatically generating such data.

Memory 220 may also include a font database 222 which may include a number of fonts available on the designer's computer. Each font may have metadata associated with it so that when an inspiration board is created, fonts can be automatically selected. For instance, if one of the words chosen by the client is happy, the font "Comic Sans" may be chosen based on the metadata associated with that font.

Also shown in FIG. 4, memory 220 includes a pattern database 223. Pattern database 223 may include a number of patterns that can be used to generate an inspiration board. Each pattern may have metadata associated with it. The metadata may include descriptors or tags that describe the pattern so that when an inspiration board is created, patterns can be automatically selected.

Thesaurus 224 may also be included in memory 220. Thesaurus 224 may be used to generate a number of synonyms associated with a series of terms that would be inputted by the designer into the computer system 100.

Figure 5:
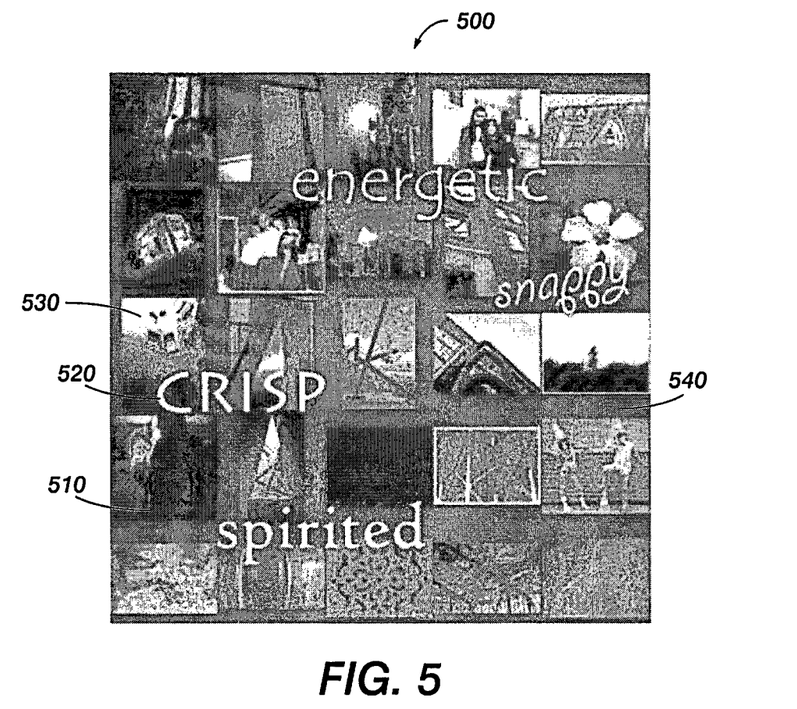
FIG. 5 illustrates an inspiration board in accordance with the present disclosure.

FIG. 5 illustrates an example of an inspiration board generated in accordance with the present disclosure. As shown in FIG. 5, inspiration board 500 also includes text 510. Text 510 may be a word or words that are associated with the words chosen by the designer or the resulting synonyms obtained from the thesaurus 224. They are displayed in a font chosen by the font selector 214 which chooses a font from the font database 222. It is possible to have more than one word and more than one font on the inspiration board as shown in element 520 which displays a different word in a different font than the word and font used in element 510. It is also possible to have no terms or words on the board, depending on the creator's preference. Image 530 is an example of an image chosen by the image selector 213 which selects an image from the image database 221. Background 540 is chosen by the pattern selector 215 from the pattern database 223. The words, fonts, images and patterns chosen by the inspiration board generator engine represent the series of words that are agreed to between the designer and the designer's client.

The process of creating the board will now be described below with reference to FIG. 6. In step 610, a designer or user inputs terms into the computer system 100 using the keyboard 130 or the mouse 140. As described above, these terms are a series of words that are agreed to between the designer and the client. The terms may include color names, adjectives and nouns. The order the terms are inputted may imply a priority to the terms. For instance, if two colors are inputted, the first color inputted might have a higher priority and might be given more weight on the inspiration board then the second color.

In step 620, the synonym selector 212 uses the thesaurus 224 to find synonyms for the terms inputted in step 610. The selected synonyms may be used to decorate the board. They may also be used as inputs to the image, font and pattern selectors to select images, fonts and patterns.

In step 630 appropriate images are chosen by the image selector 213 based on the terms inputted in step 610 and/or synonyms obtained in step 620. For instance, image selection may be performed by looking for images with the color or colors inputted in step 610. Images may also be selected using the metadata associated with the image by comparing the terms and respective synonyms with the metadata. The selected images may be compared with each other to look for minimal differences. If there are minimal differences, then the images are likely duplicates and the duplicate images are removed. In addition, a user may use a graphical user interface (GUI) (not shown) to reject images chosen by the image selector 213.

In step 640 appropriate fonts are chosen by the font selector 214 based on the terms inputted in step 610 and/or synonyms obtained in step 620. Fonts may be selected using the metadata associated with the font by comparing the terms and respective synonyms with the metadata. In addition, a user may use a GUI to reject fonts chosen by the font selector 214.

In step 650 appropriate patterns are chosen by the pattern selector 215 based on the terms inputted in step 610 and/or synonyms obtained in step 620. Pattern selection may be performed by looking for patterns using the metadata associated with the pattern by comparing the terms and respective synonyms with the metadata. In addition, a user may use a GUI to reject patterns chosen by the pattern selector 215. Alternatively, the GUI could provide different pattern choices based on the terms, synonyms, and metadata that the user may select from. Colors used for the background are chosen in step 660. A color may be chosen based on the terms inputted in step 610 or they could be chosen by a set of heuristics that are pre-programmed. For example, a term of "happy" might cause the selection of saturated primary colors, the term "sedate" may cause the selection of more neutral colors, the term "sad" may cause selection of blue or gray colors, etc. Alternatively, the color could be chosen using a GUI which would display a number of thumbnails, each thumbnail having representing a different color, and each color having been determined based on the terms, synonyms, metadata and/or heuristics described herein.

In step 670, words are selected to be placed on the inspiration board. The words can be chosen from the terms inputted in step 610 or from the synonym or synonyms obtained in step 620. They can be chosen at random for an automatic board creation or they can be selected using a GUI.

In step 680, the selected items are assembled into an inspiration board using auto image layout 217. The assembly of the inspiration board may involve processing the images selected in step 630. Processing the images may include drop shadows, rotating scaling the images, softening the image edges, sharpening the image edges, edge detection, adding borders, and/or other image enhancements. The images are then combined into a single document. In applying the images to a single document, the pattern or patterns and color or colors chosen in steps 650 and 660 are applied. Then the images chosen in step 630 are arranged according to the terms inputted in step 610 and the synonyms obtained in step 620. For instance, if one of the terms or synonyms is "professional" then there might be a high degree of symmetry in the layout of the images. On the other hand, if one of the terms or synonyms was "cheerful", the images placement might be more random. After applying the patterns, colors and images, the words selected in step 670 are placed by word applicator 216. These words are placed using the font or fonts selected in step 640. In addition, scaling, rotating, color, drop shadow, softening the image edges, sharpening the image edges, edge detection, adding borders, and/or other image enhancements can be applied to the words before they are placed on the inspiration board.

Figure 6:
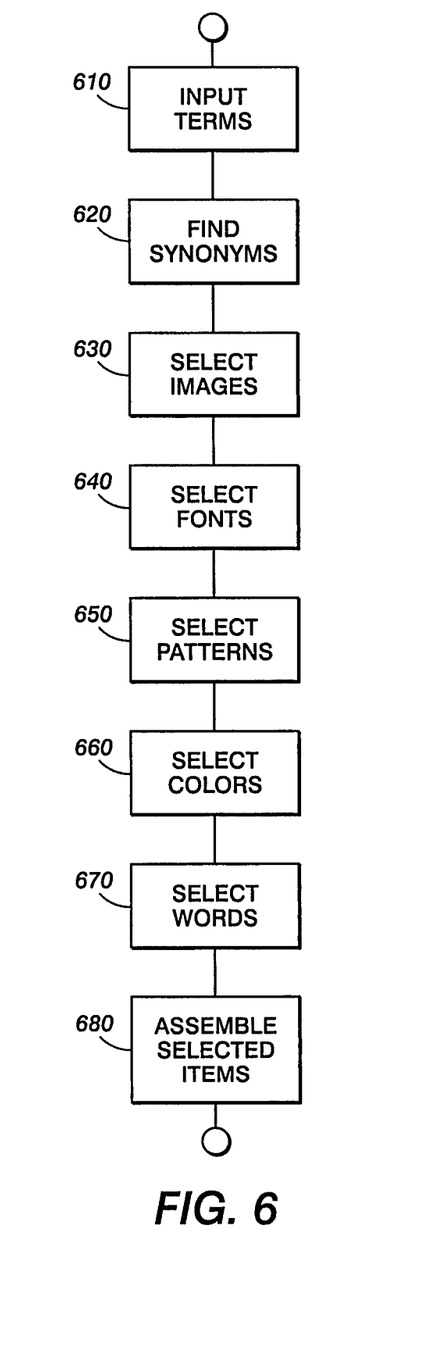
FIG. 6 illustrates a flow chart of a method in accordance with the present disclosure.

Although FIG. 6 has been described above using a particular order, the scope of the present disclosure should not be limited to that particular order. It should be readily apparent to one skilled in the art that all the steps between inputting the terms and assembling the inspiration board can be rearranged.

Once the board is assembled it can be printed out in one piece using a printer. Alternately, it can also be printed out as separate pieces and then pasted together for a three-dimensional appearance. On the other hand, the inspiration board may be kept in its electronic form to be emailed to a client or posted on a website for the client's approval.

In addition, a computer readable medium such as a semiconductor memory, a hard disk drive, or an optical recording medium may be provided. The computer readable medium may have a program stored thereon that would instruct the computer system 100 to perform the steps of FIG. 6.

Although the present disclosure is directed to assembling an inspiration board or mood board, the disclosure is not limited to such an embodiment. The system and method described in the present disclosure could also be applied to assemble other documents such as photo albums, scrapbooks, websites or any other document.

The word "printer" as used herein encompasses any apparatus, such as a digital copier, bookmaking machine, facsimile machine, multi-function machine, etc. which performs a print outputting function for any purpose.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. The claims can encompass embodiments in hardware, software, or combinations thereof.

The invention claimed is:

1. A system configured to generate an inspiration board, the system comprising:
   a processing system comprising one or more processors; and
   a memory system comprising one or more computer-readable media, the computer-readable media having stored thereon:
   a database of images, a database of fonts, and a database of patterns;
   and
   a set of computer-readable instructions that, when executed by the processing system, cause the processing system to perform operations comprising:
   receiving at least one term from a user;
   selecting at least one image from said database of images based on the at least one term;
   selecting at least one font from said database of fonts based on the at least one term;
   selecting at least one pattern from said database of patterns based on the at least one term;
   generating a graphical element by applying the at least one font to the at least one term;
   generating at least one synonym based on the at least one term;
   selecting a second image from said database of images based on the at least one synonym;
   selecting a second font from said database of fonts based on the at least one synonym;
   selecting a second pattern from said database of patterns based on the at least one synonym;
   generating a second graphical element by applying the second font to the at least one synonym; and
   assembling the inspiration board using the at least one image, the second image, the graphical element, the second graphical element, the at least one pattern, and the second pattern, wherein the assembling is performed automatically.

2. The system according to claim 1, wherein said at least one term is a color, noun, or adjective.

3. The system according to claim 1, wherein said selecting at least one image comprises at least one of the following:
reading metadata associated with images in said database of images; comparing said at least one term to said metadata; and selecting said at least one image having metadata that matches said at least one term;
selecting a plurality of images, each of said plurality of images are compared to each other and if there are minimal differences between two images, duplicate image or images are removed; and
reading metadata associated with images in said database of images; comparing said at least one synonym to said metadata and selecting said second image having metadata that matches said at least one synonym.

4. The system according to claim 1, wherein said selecting at least one font comprises:
reading metadata associated with fonts in said database of fonts;
comparing said at least one term to said metadata; and
selecting said at least one font having metadata that matches said at least one term.

5. The system according to claim 1, wherein said selecting a second font comprises:
reading metadata associated with fonts in said database of fonts;
comparing said at least one synonym to said metadata; and
selecting said second font having metadata that matches said at least one synonym.

6. The system according to claim 1, wherein said selecting at least one pattern comprises:
reading metadata associated with patterns in said database of patterns;
comparing said at least one term to said metadata; and
selecting said at least one pattern having metadata that matches said at least one term.

7. The system according to claim 1, wherein said selecting a second pattern comprises:
reading metadata associated with patterns in said database of patterns;
comparing said at least one synonym to said metadata; and
selecting said second pattern having metadata that matches said at least one synonym.

8. A method for automatically generating an inspiration board comprising:
receiving at least one term from a user;
selecting at least one image from a database of images stored in a computer system based on said term;
selecting at least one font from a database of fonts stored in said computer system based on said term;
generating a graphical element by applying said at least one font to said at least one term;
selecting at least one pattern from a database of patterns stored in said computer system based on said term;
generating at least one synonym based on the at least one term;
selecting a second image from said database of images based on the at least one synonym;
selecting a second font from said database of fonts based on the at least one synonym;
selecting a second pattern from said database of patterns based on the at least one synonym;
generating a second graphical element by applying the second font to the at least one synonym; and
assembling said inspiration board using said at least one image, said second image, said graphical element, said second graphical element, said at least one pattern, and said second pattern, wherein the assembling is performed automatically using said computer system.

9. The method according to claim 8, wherein said at least one term is a color, noun, or adjective.

10. The method according to claim 8, wherein said selecting at least one image comprises at least one of the following:
reading metadata associated with images in said database of images; comparing said at least one term to said metadata; and selecting said at least one image having metadata that matches said at least one term;
selecting a plurality of images, each of said plurality of images are compared to each other and if there are minimal differences between two images, duplicate image or images are removed; and
reading metadata associated with images in said database of images; comparing said at least one synonym to said metadata and selecting said second image having metadata that matches said at least one synonym.

11. The method according to claim 8, wherein said selecting at least one font comprises:
reading metadata associated with fonts in said database of fonts;
comparing said at least one term to said metadata; and
selecting said at least one font having metadata that matches said at least one term.

12. The method according to claim 8, wherein said selecting a second font comprises:
reading metadata associated with fonts in said database of fonts;
comparing said at least one synonym to said metadata; and
selecting said second font having metadata that matches said at least one synonym.

13. The method according to claim 8, wherein said selecting at least one pattern comprises:
reading metadata associated with patterns in said database of patterns;
comparing said at least one term to said metadata; and
selecting said at least one pattern having metadata that matches said at least one term.

14. The method according to claim 8, wherein said selecting a second pattern comprises:
reading metadata associated with patterns in said database of patterns;
comparing said at least one synonym to said metadata; and
selecting said second pattern having metadata that matches said at least one synonym.

15. The method according to claim 8, further comprising applying image processing to the at least one image selected.

16. A non-transitory computer readable storage medium having a program stored thereon to assemble an inspiration board, said program when executed by a computer performs a method comprising:
receiving at least one term;
selecting at least one image from a database of images based on said at least one term;
selecting at least one font from a database of fonts based on said at least one term;
generating a graphical element by applying said at least one font to said at least one term;
selecting at least one pattern from a database of patterns based on said at least one term;

generating at least one synonym based on the at least one term;
selecting a second image from said database of images based on the at least one synonym;
selecting a second font from said database of fonts based on the at least one synonym;
selecting a second pattern from said database of patterns based on the at least one synonym;
generating a second graphical element by applying the second font to the at least one synonym; and
assembling automatically, using a processor, said inspiration board using said at least one image, said second image, said graphical element, said second graphical element, said at least one pattern, and the second pattern.

17. A system configured to generate a document, the system comprising:
a processing system comprising one or more processors; and
a memory comprising one or more computer-readable media, the computer readable media having stored thereon;
a database of images, a database of fonts, and a database of patterns; and
a set of computer-readable instructions that, when executed by the processing system, cause the processing system to perform operations comprising:
receiving at least one term from a user;
selecting at least one image from said database of images based on said at least one term;
selecting at least one font from a database of fonts based on said at least one term;
selecting at least one pattern from said database of patterns based on said at least one term;
generating a graphical element by applying said at least one font to said at least one term;
generating at least one synonym based on the at least one term;
selecting a second image from said database of images based on the at least one synonym;
selecting a second font from said database of fonts based on the at least one synonym;
selecting a second pattern from said database of patterns based on the at least one synonym;
generating a second graphical element by applying the second font to the at least one synonym; and
assembling said document using said at least one image, said second image, said graphical element, said second graphical element, said at least one pattern, and said second pattern, wherein the assembling is performed automatically.

18. A method for automatically generating a document comprising:
inputting at least one term into a computer system;
selecting at least one image from a database of images stored in said computer system based on said at least one term;
selecting at least one font from a database of fonts stored in said computer system based on said at least one term;
generating a graphical element by applying said at least one font to said at least one term;
selecting at least one pattern from a database of patterns stored in said computer system based on said at least one term;
generating at least one synonym based on the at least one term;
selecting a second image from said database of images based on the at least one synonym;
selecting a second font from said database of fonts based on the at least one synonym;
selecting a second pattern from said database of patterns based on the at least one synonym;
generating a second graphical element by applying the second font to the at least one synonym; and
assembling said document using said at least one image, said second image, said graphical element, said second graphical element, said at least one pattern, and said second pattern, wherein the assembling is performed automatically using said computer system.

* * * * *